INVENTOR
JEAN MANTELET
By Young & Thompson
ATTYS

United States Patent Office 3,528,469
Patented Sept. 15, 1970

3,528,469
MINCING MACHINE WITH SAFETY COVER
Jean Mantelet, Paris, France, assignor to Moulinex S.A., Bagnolet, France
Original application May 16, 1966, Ser. No. 550,432. Divided and this application June 16, 1969, Ser. No. 833,440
Int. Cl. B02c 18/12
U.S. Cl. 146—68           5 Claims

ABSTRACT OF THE DISCLOSURE

A mincing machine has a bowl containing an upright spindle on which is mounted a hub that carries the blades. A removable cover for the bowl has a lower skirt that fits into an annular recess to close two diametrically opposed switches in series. Springs resist the movement of the cover skirt into this recess with a force greater than the weight of the cover, so that as a safety feature, the operator must press down on the closed cover to actuate the mincer.

---

This application is a division of copending application Ser. No. 550,432, filed May 16, 1966.

This invention relates to mincing machines, and more particularly to domestic mincers for finely dividing foodstuffs such as meat, fish, hard-boiled eggs, cheese, vegetables or seasoning herbs.

The main object of the present invention is to provide a small compact mincer suitable for domestic use which is more convenient and safer to use, easier to clean, and more effective and reliable in operation than mincers known hitherto.

According to the present invention, a mincing machine comprises a working bowl of generally cylindrical shape closed by a removable cover and supported on a stand containing a driving assembly, the output spindle of which passes through the central area of the bottom of the bowl and drives in rotation a hub within the bowl carrying one or more suitably sharpened blades.

For the purpose of improving the safety of the appliance in operation, the invention makes provision for the driving assembly to remain inoperative if the cover is not applied to the bowl; i.e., in the case of an electrically operated machine, the electrical supply to the driving assembly is interrupted by suitable means thereby obviating the risk of the blades causing injury to the operator during their rotation.

In one preferred embodiment, which is electrically driven, the supply circuit of the driving assembly includes —in series—at least one pressure-operated switch the actuating means of which is housed in the bottom of an upwardly open cavity wrought in the stand and sufficiently narrow and deep to prevent any direct operation of the means by the operator, but arranged to receive a projection on the cover which is adapted to engage in the said cavity and to operate the said actuating means when the cover is applied on the bowl.

The cavity housing the switch preferably also contains at least one resilient element to exert an upward thrust on the projection on the cover, the stiffness of this element being such that the actuating means cannot be operated by the weight of the cover alone when the latter is placed on the appliance.

In order to ensure the starting of the appliance, a certain pressure must be exerted on the cover in position on the bowl of the appliance. One thus has the assurance that before the device is started, the cover will be firmly held on the bowl and will thus be prevented from being hurled upwards during operation owing to impact against the inner face of the cover of the substances contained in the bowl.

In order that the invention may be fully understood, an embodiment in accordance therewith will now be described, by way of example, with reference to the accompanying drawings, in which.

Figure 1:
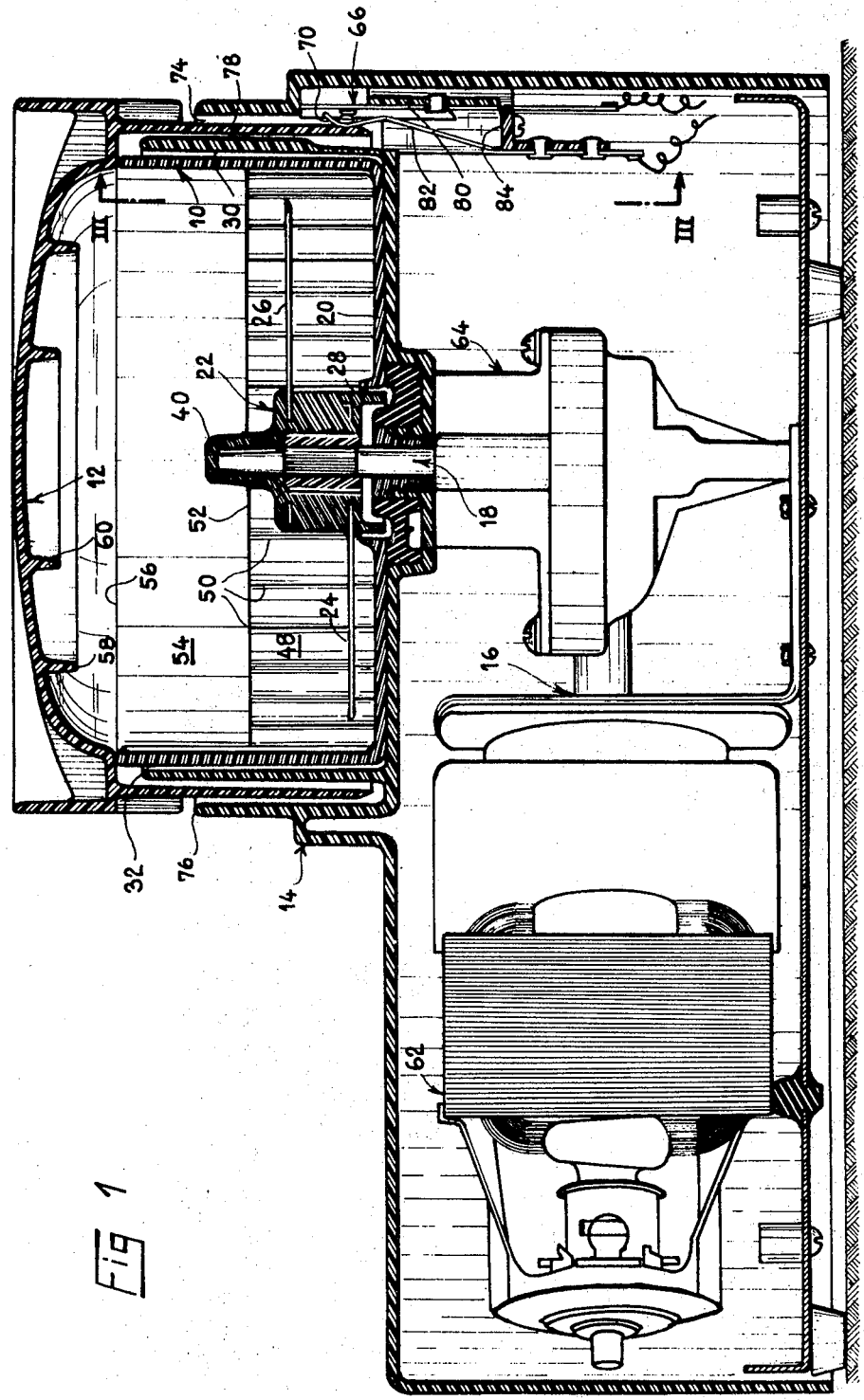
FIG. 1 illustrates a domestic mincer of the invention in vertical section along the broken line I—I of FIG. 2.

Referring to the drawings, these show an electrically operated mincer comprising a working bowl 10 of generally cylindrical shape closed by a removable cover 12 and carried on a stand 14 containing a driving or motor assembly 16 whose vertical output spindle 18 traverses the central area of the bottom 20 of the bowl and within this bowl drives in rotation a hub 22 carrying two blades 24 and 26 which are parallel to the bottom of the bowl and are suitably sharpened.

Figure 5:
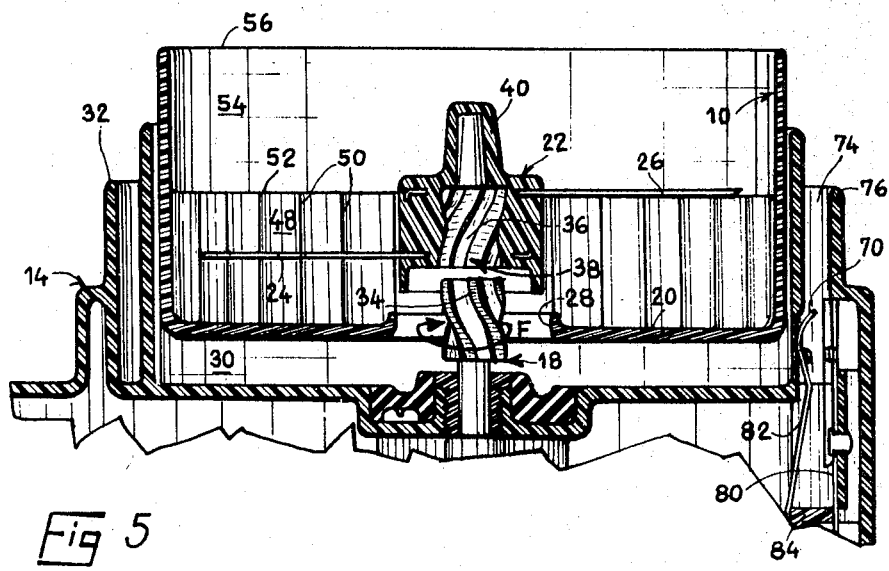
FIG. 5 is a partial vertical section of the appliance without the lid, in which the blade-carrier hub has been illustrated uncoupled from its driving spindle and the bowl lifted off the stand.

The bottom 20 of the bowl has a wide central hole 28 (FIG. 5) through which passes freely the driving spindle 18, and the stand 14 has a housing 30 formed by a cylindrical wall or enclosure 32 which receives the bowl and ensures its centering relative to the spindle 18 as well as its retention against any angular displacement.

As is apparent in FIG. 1, the driving assembly 16 comprises an electric motor 62 whose axis extends horizontally, followed by a gearbox 64 whose vertical output spindle forms the driving spindle 18 of the blade-carrier hub 22. The motor 62 is a motor of universal type turning at high speed. The gearbox 64 contains a speed reduction mechanism adapted to reduce the speed of the spindle 18 to a value lying between 3,000 and 8,000 revolutions per minute, when operating respectively under full load, and without load.

To ensure safe operation of the appliance in this embodiment, the electric supply to the motor 62 depends on the application of the cover 12 on the bowl 10. To this end, the supply circuit of the motor 62 includes in series two switches 66 and 68 whose actuating knobs or keys 70 and 72 are housed at diametrically opposed points in the bottom of a narrow annular cavity 74 formed between the centering partition 32 of the bowl and a second cylindrical partition 76 adjacent thereto and extending from the stand 14, whereas the cover 12 close to its edge has a downwardly extending cylindrical skirt 78 adapted to engage in the cavity 74 and to operate the keys 70 and 72 when the cover 12 is placed on the bowl 10. Each switch comprises two blades 80 and 82 (FIGS. 1 and 5) each carrying a contact and being upwardly directed from an insulating bracket 84 internal to the stand 14; the blade 82 is flexible and has an upper extremity outwardly inclined relative to the vertical and forming the key 70 or 72 housed in the bottom of the cavity 74 for reception of the descending skirt 78 of the cover 12. The lower edge of this skirt itself has an inclined profile adapted to slide in contact with and actuate the keys 70 and 72 when the cover is placed in position, thus causing the flexible blades 82 to bend towards the fixed blades 80, and causing the switches to close.

Figure 2:
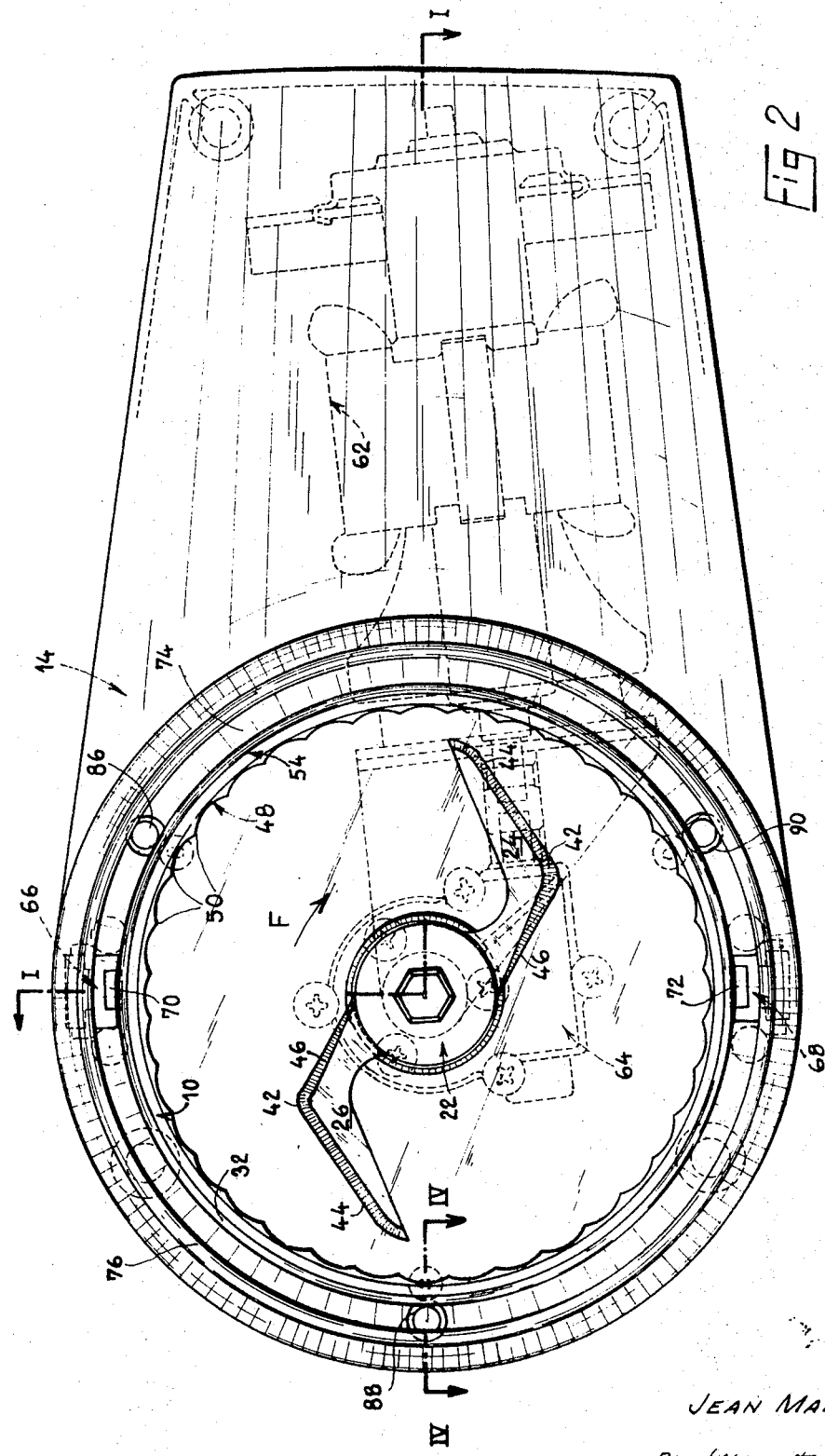
FIG. 2 is a plan view of the mincer after removal of the cover.
Figure 3:
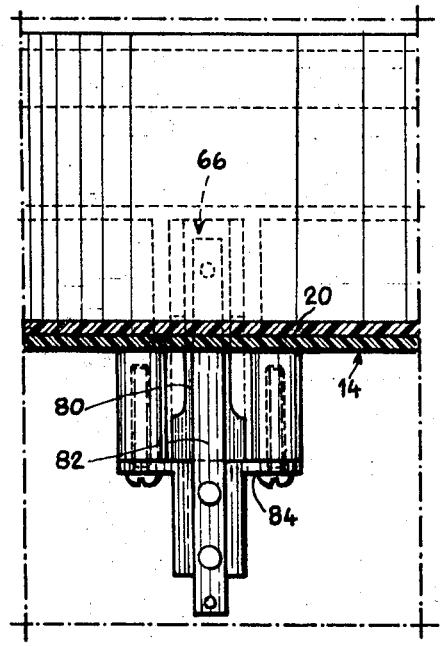
FIG. 3 is a partial vertical section along the line III—III of FIG. 1.
Figure 4:
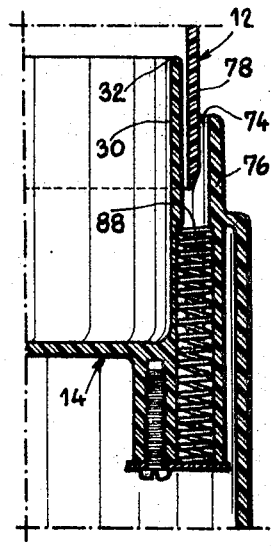
FIG. 4 is a partial vertical section of the stand along the line IV—IV of FIG. 2.

The housing cavity 74 of the switches 66 and 68 also contains three return springs 86, 88 and 90 (FIG. 2) adapted to repel the skirt 78 of the cover upwards. The stiffnes of these springs is such that the weight alone of the lid 12 when placed on the appliance is insufficient to deflect the springs enough to enable the skirt 78 of the cover to operate the actuating keys 70 and 72 of the switches.

Since the closing of the switches 66 and 68 depends on the placing in position of the cover on the bowl, the operator does not risk injury by placing the hand on the blades during their rotation. In addition, owing to the fact that there are two switches, it will be understood that the jamming of one of them by accident in its closed position does not jeopardize the safety of the appliance. Moreover, owing to the fact that these switches are widely separated, one is certain that a child cannot be injured if it manipulates the switches by means of tools or other objects, since he must use both hands to do so.

Owing to the presence of the springs 86, 88 and 90, the operator must, in order to ensure the starting of the appliance, not only place the cover on the bowl, but must also exert a certain presure thereon. One thus has the assurance that the cover will be held firmly on the bowl during operation of the machine thus preventing it from being flung upwards owing to impact against the inner face of the cover of the materials contained in the bowl.

Having described my invention, I claim:

1. A mincing machine comprising a working bowl of generally cylindrical shape closed by a removable cover and supported on a stand containing a driving assembly having an output spindle which passes through the central area of the bottom of the bowl and drives in rotation a hub within the bowl carrying at least one sharpened blade, a motor for rotating said spindle, means responsive to the presence of the cover in a bowl-closing position to actuate said motor, said actuating means comprising a pair of switches in series, and switch actuators engageable with the cover to close said switches, said switch actuators being spaced a substantial distance apart about the bowl.

2. A mincing machine comprising a working bowl of generally cylindrical shape closed by a removable cover and supported on a stand containing a driving assembly having an output spindle which passes through the central area of the bottom of the bowl and drives in rotation a hub within the bowl carrying at least one sharpened blade, a motor for rotating said spindle, means responsive to the presence of the cover in a bowl-closing position to actuate said motor, said actuating means comprising at least one switch, and an actuator for said switch disposed at the bottom of an open cavity in the mincing machine, said cover having a projection close to its edge that enters said cavity to contact said switch actuator to close said at least one swich when the cover is applied on the bowl.

3. A mincing machine as claimed in claim 2, and spring means resisting the entry of said projection into said cavity with a force greater than the weight of the cover so that the cover has to be pressed down on the bowl to actuate the motor.

4. A mincing machine a claimed in claim 1, wherein said switch actuators are disposed at two diametrically opposed points in an annular cavity which surrounds the bowl and which receives a downwardly extending projection about the edges of the cover.

5. A mincing machine as claimed in claim 4, said cover projection being in the form of a continuous cylindrical skirt.

References Cited

UNITED STATES PATENTS

| | | |
|---|---|---|
| 1,480,914 | 1/1924 | Poplawski. |
| 1,974,501 | 9/1934 | Marty. |
| 2,894,551 | 7/1959 | Otto _____ 146—68 |

FOREIGN PATENTS

| | | |
|---|---|---|
| 1,394,972 | 3/1965 | France. |

W. GRAYDON ABERCROMBIE, Primary Examiner

U.S. Cl. X.R.

146—192